United States Patent
Brill et al.

(10) Patent No.: US 9,578,499 B2
(45) Date of Patent: Feb. 21, 2017

(54) AUTHENTICATING USER SESSIONS BASED ON INFORMATION OBTAINED FROM MOBILE DEVICES

(75) Inventors: Jacob Andrew Brill, San Francisco, CA (US); Ryan McGeehan, San Francisco, CA (US); Daniel Gregory Muriello, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 850 days.

(21) Appl. No.: 13/590,806

(22) Filed: Aug. 21, 2012

(65) Prior Publication Data

US 2014/0057596 A1    Feb. 27, 2014

(51) Int. Cl.
  *H04W 12/06*   (2009.01)
  *G06F 7/04*    (2006.01)
  *G06F 17/30*   (2006.01)
  *H04L 29/06*   (2006.01)
  *G06F 21/31*   (2013.01)

(52) U.S. Cl.
  CPC ............ *H04W 12/06* (2013.01); *G06F 21/316* (2013.01); *H04L 63/126* (2013.01); *G06F 2221/2101* (2013.01); *G06F 2221/2111* (2013.01)

(58) Field of Classification Search
  CPC .......... G06F 17/30; G06F 21/316; G06F 7/04; G06F 15/16; H04L 63/083; H04L 29/06; H04L 63/126; H04W 4/22; H04W 12/06
  USPC ........................ 455/410, 411, 414.1–414.4, 456.1–456.6, 455/435.1; 713/182; 726/7, 27, 4
  See application file for complete search history.

(56) References Cited

U.S. PATENT DOCUMENTS

| 7,376,431 B2 | 5/2008 | Niedermeyer |
| 7,818,392 B1 | 10/2010 | Martino et al. |
| 8,904,506 B1 * | 12/2014 | Canavor et al. ................. 726/7 |
| 2004/0059951 A1 | 3/2004 | Pinkas et al. |
| 2006/0069921 A1 | 3/2006 | Camaisa et al. |
| 2006/0282660 A1 | 12/2006 | Varghese et al. |
| 2009/0089869 A1 | 4/2009 | Varghese |
| 2010/0211996 A1 | 8/2010 | McGeehan et al. |
| 2010/0211997 A1 | 8/2010 | McGeehan et al. |
| 2011/0161492 A1 | 6/2011 | Granville |

(Continued)

OTHER PUBLICATIONS

U.S. Office Action, U.S. Appl. No. 12/646,800, Feb. 1, 2013, seventeen pages.

(Continued)

*Primary Examiner* — Khawar Iqbal
(74) *Attorney, Agent, or Firm* — Fenwick & West LLP (57) ABSTRACT

An online system determines whether a request for creating a session with the online system is suspicious. The online system associates a user account with a mobile key of a mobile device and geographical locations of the mobile device. The mobile key comprises unique identifier of the mobile device that is permanently stored on the mobile device. Upon receiving a request to create a session for the user account, the online system compares information associated with the user request with information describing the mobile device. For example, information associated with the user request can be a location determined by mapping internet protocol addresses obtained from the request. The online system determines whether the request is suspicious based on the comparison. If the online system determines that the request is suspicious, the online system may require enhanced authentication before granting the request.

24 Claims, 6 Drawing Sheets

(56) References Cited

U.S. PATENT DOCUMENTS

| | | | | |
|---|---|---|---|---|
| 2011/0167440 | A1* | 7/2011 | Greenfield | H04L 63/102 725/25 |
| 2012/0310836 | A1 | 12/2012 | Eden et al. | |
| 2012/0324242 | A1* | 12/2012 | Kirsch | G06Q 20/0855 713/189 |
| 2012/0331088 | A1* | 12/2012 | O'Hare | G06F 21/6227 709/214 |
| 2013/0085914 | A1* | 4/2013 | McPherson | H04L 61/1511 705/34 |
| 2013/0212270 | A1* | 8/2013 | Hsieh | H04L 67/32 709/225 |
| 2013/0212704 | A1* | 8/2013 | Shablygin | G06F 21/6218 726/28 |
| 2013/0254850 | A1* | 9/2013 | Alison | H04W 4/206 726/4 |
| 2013/0254857 | A1* | 9/2013 | Bajenov | G06F 21/00 726/7 |
| 2014/0115676 | A1* | 4/2014 | Coghlan | H04W 12/06 726/6 |
| 2014/0157381 | A1* | 6/2014 | Disraeli | G06F 21/31 726/7 |
| 2014/0214688 | A1* | 7/2014 | Weiner | G06Q 20/3227 705/71 |
| 2014/0337998 | A1* | 11/2014 | Johansson et al. | 726/27 |
| 2015/0074240 | A1* | 3/2015 | Klein, Jr. | G06F 17/30017 709/219 |
| 2015/0105040 | A1* | 4/2015 | Ionescu et al. | 455/404.1 |
| 2015/0264050 | A1* | 9/2015 | Neuman | H04L 63/08 713/155 |
| 2016/0212060 | A1* | 7/2016 | Holcombe | H04W 4/001 |

OTHER PUBLICATIONS

U.S. Office Action, U.S. Appl. No. 12/646,803, Apr. 11, 2013, sixteen pages.

Initiative for Open Authentication, "OATH Reference Architecture Release 1.0," 2004-2005, pp. 1-38, can be retrieved at <http://www.openauthentication.org/webfm_send/13>.

Initiative for Open Authentication, "OATH Reference Architecture Release 2.0," 2004-2007, pp. 1-50, can be retrieved at <http://www.openauthentication.org/webfm_send/1>.

M'Raihi, D., et al., "HOTP:An HMAC-Based One-Time Password Algorithm," The Internet Society, Dec. 2005, pp. 1-31, can be retrieved at <http://www.ietf.org/rfc/rfc4226.txt>.

United States Patent and Trademark Office, Non-final Office Action, U.S. Appl. No. 12/646,803, Jun. 21, 2012, 16 Pages.

* cited by examiner

AUTHENTICATING USER SESSIONS BASED ON INFORMATION OBTAINED FROM MOBILE DEVICES

BACKGROUND

This invention in general relates to authenticating sessions for interacting with online systems and more specifically to authenticating sessions based on mobile devices used for interacting with the online system.

User accounts of online systems get compromised when user credentials are stolen by unauthorized users. For example, illegitimate users resort to phishing to obtain confidential information from users, such as user names, passwords, account numbers and the like, by pretending to be legitimate online entities. A fraudulent website presents a look and feel that is almost identical to a legitimate website that may be a popular and trusted website. Unsuspecting users who are unaware that they are interacting with a fraudulent website provide sensitive information to the fraudulent website. The fraudulent website obtains the user name and password of the user and can subsequently use it for unauthorized access to the online system.

Once a user account is compromised, the unauthorized user has access to the account and can misuse the account for illegitimate purposes. The unauthorized user may be able to post messages using the account, get access to sensitive user information such as credit card numbers, social security numbers, or date or birth and even execute financial transactions, if allowed by the online system. Damages from these unauthorized account access can include stealing of information as well as substantial financial losses.

Online systems attempt to prevent credentials from being stolen and user accounts from getting compromised. For example, online systems can require users to use passwords that cannot be guessed easily and also require users to change passwords on a regular basis. Some online systems require enhanced authentication procedures, for example, by requesting the user to identify an image preselected by the user. Once a user's account has become compromised, however, online systems must try to prevent or limit the damage caused by unauthorized account access by determining whether a user session is legitimate or is from an unauthorized person who obtained a user's account information unlawfully. It is preferred that the online system detect early if a session is created by an unauthorized person in order to limit the damage that can be caused by the person.

SUMMARY

Embodiments of the invention allow an online system to determine whether a request for creating a session with the online system is suspicious. The online system associates a user account with a mobile key of a mobile device and geographical locations of the mobile device. The mobile key may comprise a value permanently stored on the mobile device that uniquely identifies the mobile device. Upon receiving a request to create a session for the user account, the online system compares information associated with the user request with the information describing the mobile device. The online system determines whether the request is suspicious based on the result of the comparison. In an embodiment, if the online system determines that a request from a client device is suspicious, the online system requires enhanced authentication before granting the request.

In some embodiments, the mobile key is a cryptographic signed key stored upon manufacture of the mobile device and the geographical location of the mobile device is obtained from a global positioning system (GPS) of the mobile device. In an embodiment, the information describing the mobile key is obtained from requests received from the mobile device and stored in connection with the user account. For example, if the online system determines that a request received from the mobile device is the first request to login to the user account, the online system stores the mobile key and geographical location obtained from the mobile device in association with the user account. The online system also associates geographical locations obtained in subsequent requests that include the mobile key with the user account.

In an embodiment, if the online system determines that the request includes the mobile key, the online system determines that the request is not suspicious. If the request does not include the mobile key, the online system obtains an internet protocol (IP) address from the request and maps the IP address to a location. The online system compares the location determined from the request with the geographical locations of the mobile device associated with the user account. If the location determined for the current request is more than a threshold distance from the geographical location of the mobile device, the request may be determined to be suspicious.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
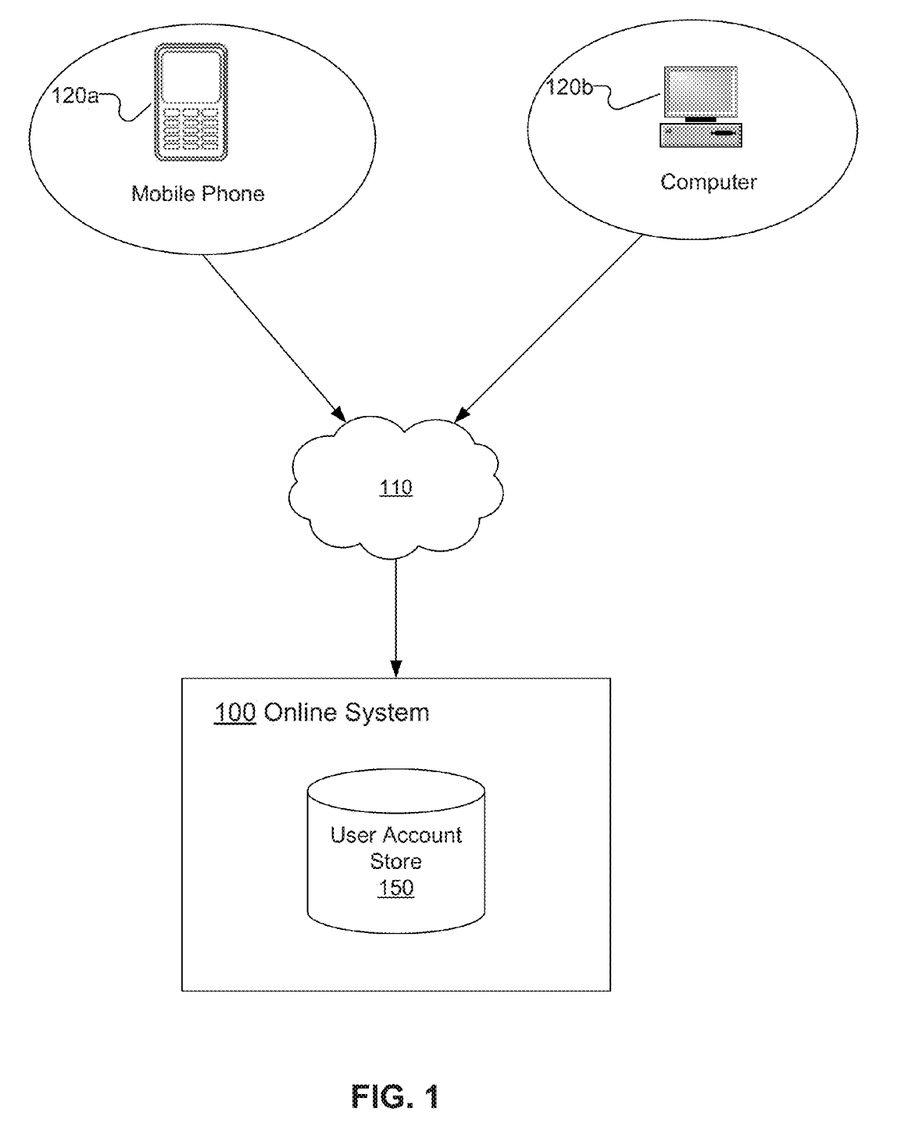
FIG. 1 shows the overall system environment illustrating client devices interacting with an online system, in accordance with an embodiment of the invention.

FIG. 1 shows the overall system environment illustrating users interacting with an online system using client devices, in accordance with an embodiment of the invention. The system environment comprises one or more client devices 120, an online system 100, and a network 110. In alternative configurations, different and/or additional modules can be included in the system.

The online system 100 can be any system that allows users to interact with it for example, a website with which users can interact or a proprietary system of an enterprise that provides information to its employees. A typical online system 100 tracks users of the online system, for example, by storing user information as user accounts. An online system 100 may require users to register with the online system 100 by providing information identifying the user. A user may be required to provide name, date of birth, login name, password for authenticating user sessions, and demographic information as part of a registration process. The online system creates a user account for the user and stores the information provided by the user in association with the user account. In an embodiment, the user account information is stored in the user account store 150 illustrated in FIG. 1.

The online system 100 may associate subsequent interactions with the user with the user account. For example, the online system may store information provided explicitly by the user or information implicitly gathered by the online system. An online system 100 can typically obtain information describing the client device 120 used to create a session with the online system 100. This information may be provided by the communication protocol used by the client device 120 to interact with the online system 100. For example, the communication protocol may provide information describing session cookies stored on the client device 120, internet protocol address (IP address) of the client device, information describing software running on the client device including the operating system and so on. In an embodiment, this information is used by the online system to determine whether a request to create a session is suspicious or not.

A user may interact with the online system 100 using different types of client devices 120. These include mobile devices 120*a* such as cell phones, smart phones, tablets, laptops, personal digital assistants (PDAs) as well as non-mobile client devices, for example, desktop computers 120*b*. FIG. 1 and other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

In one embodiment, the client device 120 can be a computer system executing, for example, a Microsoft Windows-compatible operating system (OS), Apple OS X, and/or a Linux distribution. A client device 120 typically executes software that provides a user interface for interacting with the online system 100, for example, an internet browser that allows a client device to interact with websites. A client device 120 is typically configured to communicate via network 110, which may comprise any combination of local area and/or wide area networks, using both wired and wireless communication systems.

The network 110 enables communications between the client devices 120 and the online system 100. In one embodiment, the network 110 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks such as the Internet.

System Architecture

A client device 120 can store information associated with the online system 100 when the client device 120 interacts with the online system 100, for example, session cookies. A session cookie may store a name value pair such that the name identifies the cookie and the value comprises information stored as part of the cookie.

Figure 2A:
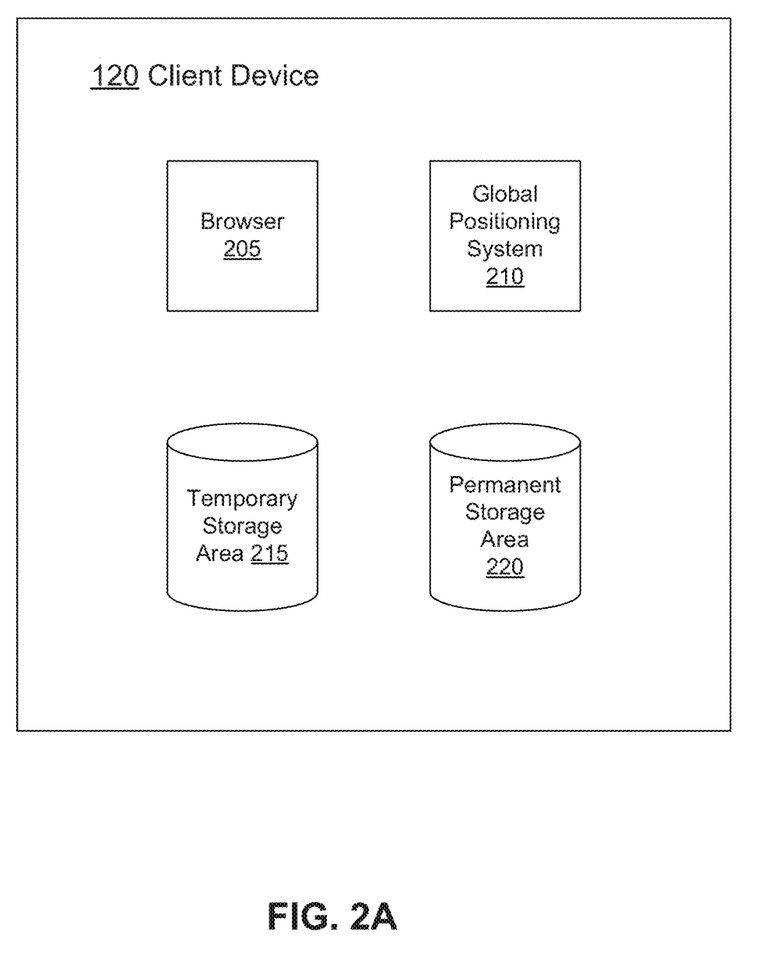
FIG. 2A is a diagram of the system architecture of a client device that interacts with an online system, in accordance with an embodiment of the invention.

FIG. 2A is a diagram of the system architecture of a client device 120 that interacts with an online system 100, in accordance with an embodiment of the invention. The client device 120 comprises a browser application 205, a temporary storage area 215, a permanent storage area 220, and a global positioning system (GPS) 210. A client device may have fewer or more components than those illustrated in FIG. 2A. For example, non-mobile devices such as desktop computers may not include a GPS 210 whereas mobile client devices such as mobile phones are more likely to include a GPS 210.

The browser application 205 allows the client device 120 to interact with different online systems 100. A browser application 205 is typically allowed to access a portion of the storage area of the client device 120. For example, the browser application 205 may use the temporary storage area 215 for storing information used for interacting with online systems 100.

Values stored in the temporary storage area 215 can typically be deleted or overwritten by the browser application 205 or by other applications executing on the online system 100. For example, if the information stored in the temporary storage area 215 reaches a limit allotted to the temporary storage area 215, the information stored in the temporary storage area 215 may be deleted or marked as deleted. The information marked as deleted can be overwritten by subsequent writes by the browser application 205. A browser application 205 may also allow a user to explicitly clear the temporary storage area 215, for example, by manually running a command, or specifying a system configuration setting that causes the browser application 205 to automatically delete information stored in the temporary storage area 215 periodically.

The online system 100 may request the browser application to store cookie values the temporary storage area 215. For example, the online system 100 may generate a unique identifier and store it on a client device 120 for future identification of the client device. The unique identifier value can be provided by the client device to the online system 100 during subsequent requests sent by the client device to the online system 100. The unique identifier can be used by the online system to correlate information of different sessions created by the same client device 120. For example, the online system 100 can determine the number of times a user uses a particular client device 120, the number of different client devices 120 used by the user to interact with the online system 100, and so on. However, if the cookie stored on the client device is deleted, the online system 100 may not be able to accurately identify the client device 120 that is sending the subsequent requests. The online system 100 may treat the client device 120 as a new client device that has not previously interacted with the online system 100. As a result, the online system 100 may generate a new unique identifier value and store it on the client device 120. However, the online system 100 may not be able to determine that the client device with the new identifier is the same as the client device with the previous identifier.

Embodiments allow the online system 100 to identify a client device 120 using a unique identifier that is permanently stored in the client device 120. In an embodiment, the unique identifier of the client device is stored in a portion a permanent storage area 220 of the client device. Data may be written to the permanent storage 220 area during manufacturing of the device, for example at a factory manufacturing the device. The information written to the permanent storage area 220 cannot be deleted or overwritten when the device is used by the user. For example, the permanent storage area 220 may be read only memory (ROM) that allows a manufacturer to write only once. After the initial write operation to the permanent storage area 220, the device is allowed only to read from the permanent storage area 220 but not write to it. In some embodiments, data written in the permanent storage area 220 may be overwritten using specialized equipment that is not typically used by the end user. Accordingly, the data written in the permanent storage area 220 is not changed during normal operation of the device by a user.

In an embodiment, a mobile device 102*a* is provided by manufacturers with a mobile key written to the permanent storage area 220. The mobile key uniquely identifies the mobile device 120*a*. The value of the mobile key is written to the permanent storage area at manufacturing time of the mobile device. Applications running on the mobile device cannot delete the value of the mobile key or modify it since the value is written in permanent storage area 220. The mobile key of the mobile device is provided to the online system 100 when the mobile device sends a request to the online system 100. In an embodiment, the mobile key is a signed cryptographic key. A recipient of a message encrypted using the signed cryptographic key can assume that the sender of the request is a known sender and the information in the request was not altered in transit or forged. The message that is transmitted from the mobile device to the online system can be any message that the online system and the mobile device have agreed upon. For example, the message can be a text string that is predefined. The online system and the mobile device can change the message based on a predefined schedule. In an embodiment, the online system can send a message to the mobile device and request the mobile device to encrypt it using the key stored at the mobile device. The online system 100 can verify the authenticity of the mobile device by decrypting the encrypted message that the mobile device sends back. Since the cryptographic key is stored in the mobile device and never transmitted, no other device has the same cryptographic key. Accordingly, no other device can encrypt the message to produce the result that the mobile device can. In an embodiment, the online system has a public key corresponding to the cryptographic key (which can be considered a private key). The online system 100 uses the public key to decrypt the message received from the mobile device. Even though other systems can have access to the public key and are able to decrypt the message received from the mobile device, no system or device has access to the private key or cryptographic key stored at the mobile device. As a result, no other device can encrypt the message to generate the encrypted message that the mobile device can. The online system uses this ability of the mobile device to generate a unique encrypted output for a message that no other device can (unless they have access to the mobile key). In the description herein the mobile key is also referred to as a cryptographic key, signed cryptographic key, or private key. A request sent by the mobile device that includes a message encrypted using the mobile key is also called a signed request.

Certain mobile devices include a GPS 210. The GPS 210 can determine the geographical location of the device, for example, the latitude and longitude at which the device is located. The GPS 210 can be a satellite based navigation system that communicates with satellites to determine the position of the device. The geographical location of the device provided by the GPS system can be provided to the online system 100 when the device sends a request to the online system 100. If the online system 100 receives a signed request that includes a message encrypted using the mobile key as well as the current geographical location of the mobile device, the online system 100 stores the geographical location as a reliable location of the mobile device. If the mobile device is associated with a user account, the online system 100 can associate the reliable geographical locations of the mobile device with the user account. For example, the online system 100 can interpret a reliable geographical locations as a location at which the mobile device was physically present. The geographical location provided by a GPS is considered more reliable than a location determined by mapping an internet address of the device to a location. This is so because the mapping from IP address to a location is approximate and covers large areas. Furthermore, the IP address may not be uniquely associated with the device, for example, if a proxy server routes the request from the client device to the online system 100. Methods and systems for using netblocks for determining whether a session is suspicious or not are described in U.S. patent application Ser. No. 12/646,800, filed on Dec. 23, 2009 and U.S. patent application Ser. No. 12/646,803 filed on Dec. 23, 2009, each of which is incorporated by reference in its entirety in the present application.

Typically, a user of a mobile device, for example, a smart phone keeps the mobile device in possession of the user. If the user loses the mobile device, the user typically takes quick action to inform the appropriate providers that the device is stolen, for example, the provider of the phone service or the internet service for the mobile device. Accordingly, the online system 100 can also be informed that the device is stolen and the online system 100 should temporarily deactivate the user's account. However, users rarely lose their mobile devices. Therefore, if there is no such indication of the device being stolen, the online system 100 operates under the assumption that the mobile device is in possession of an authorized user.

In certain situations, the mobile device may be used by multiple users that are closely related to each other, for example, family members. An online system that is a social networking system may store information describing relationships between users including family members or other types of relationships. In these situations, if a request is received from a mobile device to create a session for an account of the user that is connected to the user originally associated with the mobile device, the online system may send an alert to the user. If the user responds to the alert by indicating that the user has not lost his mobile device, the online system 100 can add the other user of the mobile device in a safe list of users of the mobile device. Subsequent requests from any of the users belonging to the safe list may be treated as not-suspicious. In an embodiment, if more than a threshold number of users are determined to have sent a request using the same mobile device, the online system marks the mobile device information stored in the user accounts as less reliable for purposes of determining whether a session is suspicious or not. For example, a subsequent request received from a mobile device that is associated with a large number of users may not be determined to be not suspicious without further verification.

Figure 2B:
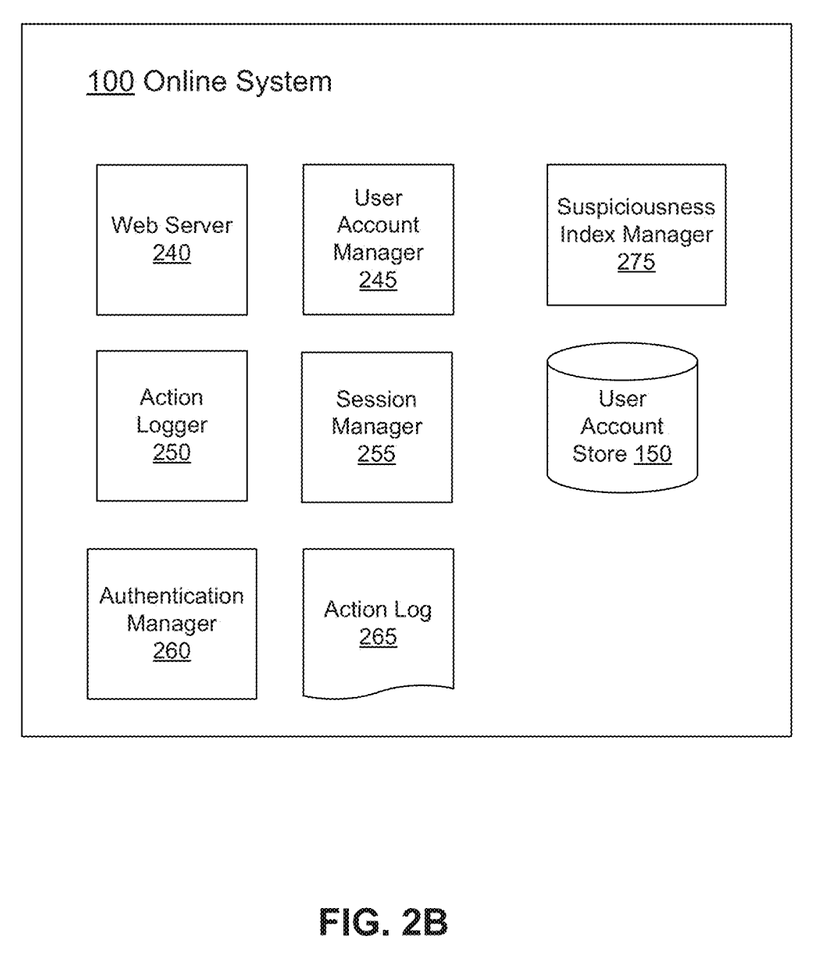
FIG. 2B is a diagram of the system architecture of an online system that allows client devices to interact with the online system, in accordance with an embodiment of the invention.

FIG. 2B is a diagram of the system architecture of an online system that allows client devices to interact with the online system, in accordance with an embodiment of the invention. The online system 100 includes a web server 240, an action logger 250, a session manager 255, user account manager 245, an authentication manager 260, an action log 265, and a user account store 150. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system.

The web server 240 links the online system 100 via the network 110 to one or more client devices 120; the web server 240 serves web pages, as well as other web-related content, such as Java, Flash, XML, and so forth. The web server 240 may include a mail server or other messaging functionality for receiving and routing messages between the online system 100 and the client devices 120.

The session manager 255 manages sessions created for allowing client devices 120 to interact with the online system 100. For example, a session may be created when a user logs into the online system 100 from a client device 120 or retrieves information from the online system 100. The session manager 255 can analyze the information received in a request to identify the client device 120. For example, a request from the client device to the online system may include the IP address of the client device 120 or values of session cookies stored on the client device 120.

The suspiciousness index manager 275 obtains the information associated with a session created by the user and analyzes the information to determine a suspiciousness index for the session that indicates likelihood that the session was created for a legitimate use by an authentic user of the account rather than an illegitimate use by someone who stole the user's credentials. The suspiciousness index can be in the form of a numerical score assigned to a user session indicating the chances that the session is created by an illegitimate user or it can be a value from a predetermined set of values indicating the degree of suspicion associated with the session's authenticity, for example, low, medium, or high degree of suspicion. In another embodiment, the suspiciousness index can be a binary value indicating whether the session is safe or not safe. The suspiciousness index associated with a session may be provided to other modules or systems within the online system 100 in real-time as new sessions are created. Alternatively, the suspiciousness index may be used by off-line applications that perform batch processing, for example, based on information available in the action log 265. For example, an application can perform statistical analysis of illegitimate activity associated with user accounts on online system 100.

The authentication manager 260 obtains user credentials from a user creating a session and authenticates actions based on the session. For example, the login and password information is collected from a user and verified against information from the user account store 150 before allowing the user access to information. Based on the degree of suspicion associated with a user session as determined by the suspiciousness index manager 275, the authentication manager 260 may require different levels of authentication from a user before allowing access to the user based on the user session. For example, a low degree of suspicion associated with a session may result in the authentication manager 260 allowing access to information with simple authentication based on login and password. On the other hand a highly suspicious session may cause the authentication manager 260 to require additional authentication or to use a more sophisticated authentication mechanism that results in a higher rate of success compared to simpler authentication mechanisms.

In one embodiment, additional logging is performed when a session is determined to be suspicious to enable subsequent analysis of the suspicious sessions. Some embodiments may send alerts to appropriate recipients when a session is determined to be highly suspicious. The recipients of the alerts can take appropriate remediation action depending on the severity of the actions taken by a suspicious session.

The action logger 250 is capable of receiving communications from the web server 240 about user actions on and/or off the online system 100. The action logger 250 populates the action log 265 with information about user actions to track them. Any action that a particular user takes with respect to another user is associated with each user's profile, through information maintained in a database or other data repository, such as the action log 265. Such actions may include, for example, sending a request to the online system 100, receiving information from the online system 100, and so on.

Figure 3:
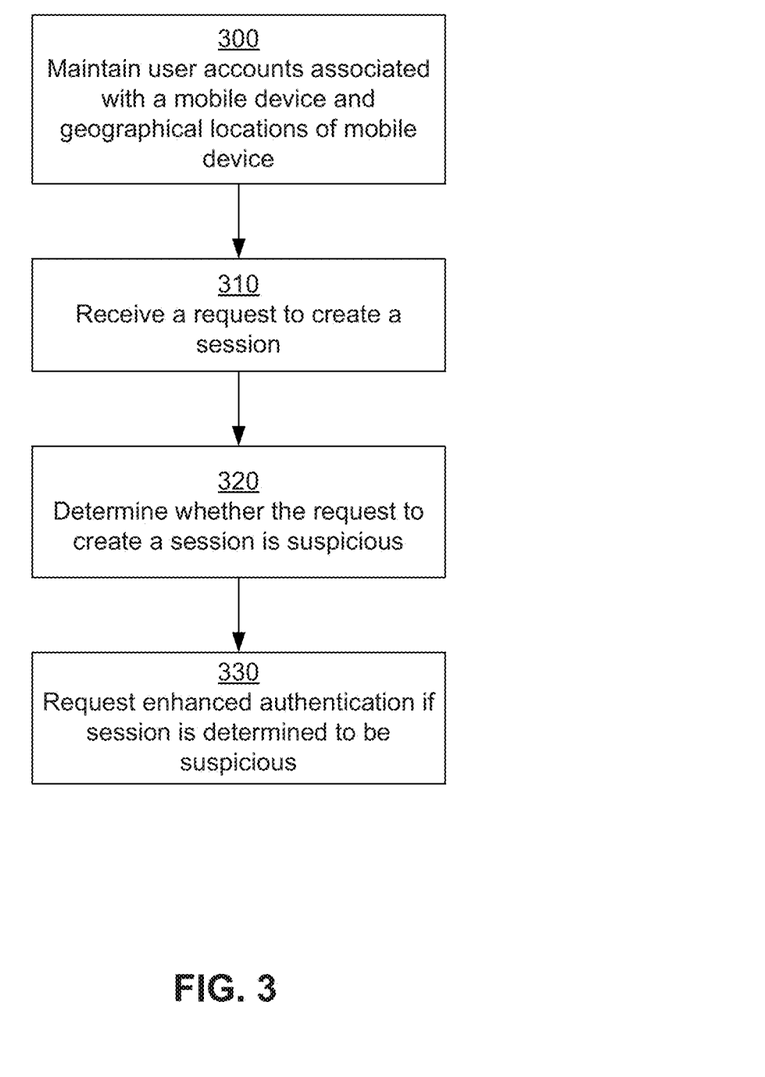
FIG. 3 a flowchart of the process illustrating how the online system determines whether a user session is suspicious, in accordance with an embodiment of the invention.

FIG. 3 is a flowchart of the process illustrating how an online system 100 determines whether a user session is suspicious, in accordance with an embodiment of the invention. The user account manager 245 maintains 300 user accounts in the online system 100. A user account of a user may be associated with a mobile key obtained from a mobile device 120b of the user and one or more geographical locations of the mobile device 120b.

When a user creates a session to interact with the online system 100 using a mobile device 120b, the online system 100 may receive information describing the mobile device 120b. For example, the communication protocol used by the mobile device 120b to send requests to the online system 100 may provide information describing the mobile device to the online system 100 as part of the requests. These requests may include a message encrypted using the mobile key and the geographical location of the mobile device obtained from the GPS of the mobile device. The user account manager 245 uses the encrypted message to ensure that the request was received from the mobile device, for example, by decrypting the message using a public key associated with the mobile device. Upon verification that the request was received from the correct mobile device, the online system 100 associates the geographical location of the mobile device with the user account. The user account manager 245 may store the information describing the mobile device in the user account store 150. Typically a user is likely to use the mobile device to interact with the online system 100 from a limited set of geographical locations, for example, work place, home, a friend's place, a coffee shop, or other places typically visited by the user.

The online system 100 receives 310 subsequent requests to create a session using the user account from the mobile device or other computing devices. The requests received from computing devices other than mobile devices are not likely to include an encrypted message. Accordingly, the online system 100 can identify whether a request was sent by the mobile device or a device other than the mobile device. The online system 100 performs analysis of the information received in the requests to determine 320 whether these requests are suspicious or not. The suspiciousness index manager 275 may determine a suspiciousness index for the request to determine a degree of suspiciousness associated with the request. A suspicious request is a request that is likely to be sent by a user that has unauthorized access to the user account of the user. If the authentication manager 260 determines that the request is suspicious, the authentication manager 260 requests 330 enhanced authentication from the sender of the request before granting the request. The enhanced authentication may comprise requiring the user to answer a CAPTCHA (completely automated public Turing test to tell computers and humans apart) challenge-question. In some embodiments, the authentication manager 260 suspends the user account temporarily, for example, if there are repeated requests to create a session for the user account that are highly suspicious. In other embodiments, the authentication manager 260 denies the request and sends an error message to the requestor indicating that the request is denied.

Figure 4:
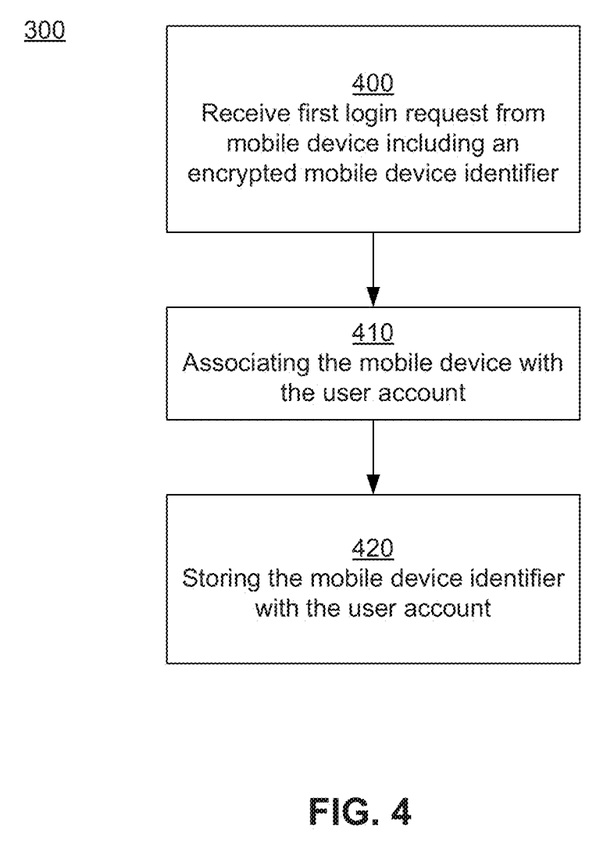
FIG. 4 is a flowchart of the process illustrating how the online system associates a user account with information describing a mobile device, in accordance with an embodiment of the invention.

FIG. 4 is a flowchart of the process illustrating how the online system associates a user account with information describing a mobile device, in accordance with an embodiment of the invention. FIG. 4 illustrates an embodiment of the step 300 of the process shown in FIG. 3. The online system 100 tracks the mobile device of the user of the user account. In an embodiment, the online system determines whether the online system has received 400 the first login request from a mobile device or the first request to create a session with the online system 100. For example, the online system 100 may received a unique identifier (also referred to herein as a mobile device identifier), for example, the serial number of the mobile device in the message. If the unique identifier is received with a request to login or a request to create a session with the online system 100, the user account manager 245 compares the unique identifier with existing mobile device identifiers associated with the user account and stored in the online system 100. If the received identifier does not match any existing mobile device identifiers associated with the user account or if there are no previous mobile device identifiers associated with the user account, the request received is considered the first login request or the first request to create a session using the mobile device. The user account manager 245 associates 410 the received mobile device identifier with the user account. If the request also comprises session attributes, for example, information describing geographical location of the mobile device obtained from a GPS of the mobile device, the user account manager 245 stores 420 the session attribute as well as the mobile key in association with the user account. In an embodiment, the user account manager 245 stores the session attributes received with the request in the user account store 150.

Figure 5:
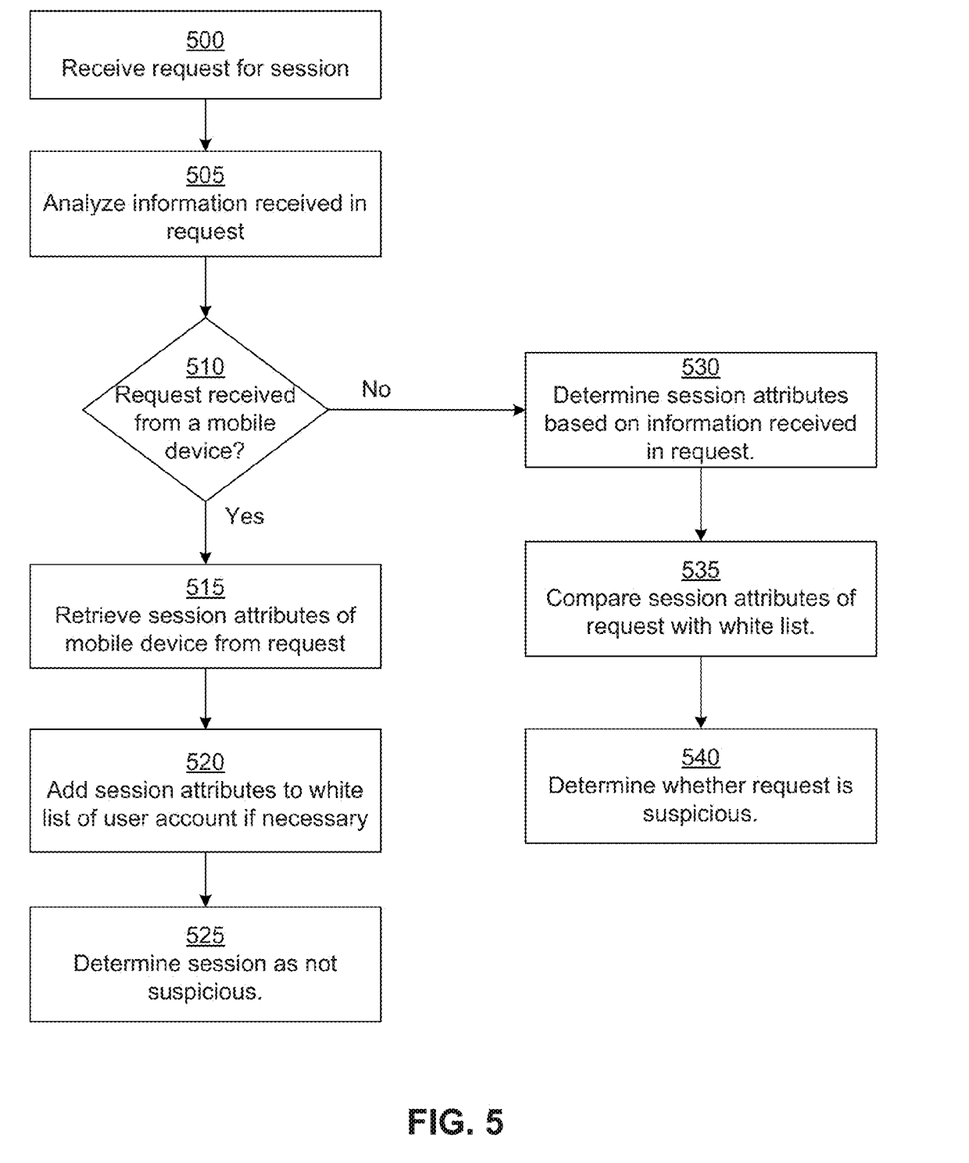
FIG. 5 is a flowchart of a process illustrating how information associated with a mobile device is used to determine whether a request to create a session with the online system is suspicious or not, in accordance with an embodiment of the invention.

FIG. 5 is a flowchart of a process illustrating how information associated with a mobile device of a user is used to determine whether a session created by the user is suspicious, in accordance with an embodiment of the invention. The web server 240 receives 500 a request to create a session. The web server 240 analyzes 505 the information received in the request. In an embodiment, the web server obtains information describing the client device 120 by performing multiple interactions with the client device rather than a single request. The web server 240 passes the information obtained from the client device to the session manager. The session manager 255 determines whether to create a session for the request based on the information received from the client device 120. The session manager invokes the suspiciousness index manager 275 to determine whether the request is suspicious or not.

The suspiciousness index manager 275 verifies 510 whether the request was sent from a mobile device. For example, the suspiciousness index manager 275 may check if the request includes an encrypted message. If the request includes an encrypted message, the mobile device decrypts the message to determine whether the mobile device is a known mobile device or a new mobile device that should be associated with the user account. If there is no encrypted message in the request, the suspiciousness index manager 275 performs subsequent processing based on the assumption that the client device is not a mobile device. Accordingly, the suspiciousness index manager 275 obtains information describing the client device to determine whether the request for creating a session is suspicious or not. In the embodiment shown in FIG. 5, suspiciousness index manager 275 determines 530 session attributes associated with the request based on the information received in the request. For example, if the request comprises an IP address of the client device, the session manager 255 can determine a location associated with the IP address. In an embodiment, the online system 100 maintains a mapping from IP addresses or ranges of IP addresses to geographical regions to determine the location of a device using an IP address. The suspiciousness index manager 275 compares 535 the session attributes received in the request with the stored session attribute values in a white list associated with the user account to determine 545 whether the request is suspicious or not.

If the suspiciousness index manager 275 determines that a location of the client device determined based on session attributes is more than a threshold distance away from any of the reliable geographical locations of the user account, the suspiciousness index manager 275 determines the request to be suspicious. The suspiciousness index manager 275 may determine a degree of suspiciousness of the request based on various factors, for example, the distance between the geographical location of the client device from the reliable geographical locations, the difference between the time the request was received compared to time that the last known request was received from a mobile device with the reliable geographical location. For example, if the user communicated using the mobile device with the online system a few hours ago from a geographical location in California and the client device that sent the current request was located in Asia, the current request may be determined to be highly suspicious since the likelihood of the user travelling such a distance in a few hours is very small. In this situation, the authentication manager 260 may lock the account and deny any subsequent requests to create a session until an enhanced authentication process is successfully completed. However, if the last request received from the mobile device of the user was several weeks ago and the current request is obtained from a location that is within a reasonable travel distance of the reliable geographical location obtained from the mobile device, there is a reasonable likelihood that a person could travel this distance in the given time. Accordingly, the current request may be determined by the suspiciousness index manager 275 to have a low degree of suspicion and the authentication manager 260 may require a simpler authentication process, for example, requiring the user to solve a CAPTCHA challenge question. Once the user passes the enhanced authentication required by the authentication manager 260, the new location of the client device sending the request may be stored as a safe location associated with the user.

If the suspiciousness index manager 275 determines 510 that the current request for creating a session is a signed request from a mobile device, the suspiciousness index manager 275 verifies that the signed request is from a mobile device and invokes the user account manager 245 to update the user's account information if necessary. For example, if the user account manager 245 determines that the mobile device is not associated with the user account store 150, the user account manager 245 determines that the current request is the first request from the mobile device and stores information describing the mobile device, for example, a mobile device identifier with the user's account. The user account manager 245 also retrieves 515 geographical location of the mobile device used to send the request, irrespective of whether this is the first request from the mobile device. The user account manager 245 verifies whether the geographical location has been previously stored for the user account as a reliable geographical location associated with the user account. If this is the first request in which the online system 100 has received this geographical location for the user account, the user account manager 245 adds 520 the geographical location as a reliable location for the user account. If the geographical location has previously been received by the online system (or even otherwise), the user account manager 245 updates the information describing the geographical location, for example, the most recent time when the geographical location was received in a request from the user.

In an embodiment, the enhanced authentication process required by the authentication manager 260 comprises requiring the user to send a request to create a session using the user's mobile device that has been previously used by the user to interact with the online system 100. The authentication manager 260 may send a communication to the user, for example, by email requesting the user to login using the user's mobile device or create a session with the online system 100 using the user's mobile device. If the user has previously logged in to the online system 100 using the mobile device, a mobile device identifier for the mobile device is already stored in the user account store 150. The authentication manager 260 waits for a request from the user's mobile device or any other enhanced authentication process to be completed. The authentication manager 260 may deny all requests for creating a session until the user sends a request from the user's mobile device or performs an alternative enhanced authentication process.

Examples of alternative enhanced processes include calling by phone to provide verification information, sending verification information by mail, etc. However, these alternative enhanced procedures require manual processing and therefore require the enterprise managing the online system 100 to maintain personnel for handling such request. Furthermore, processing of these requests can be slow since the user may take time to make a call or mail the user's information. Besides, manual processing by personnel associated with the online system 100 can further delay processing of the request. In contrast, requiring the user to send a request to login or send a request to create a session using the user's mobile device is easy for the user to perform. Besides the verification of the request by the online system 100 can be performed automatically without requiring any human intervention. For example, the online system 100 can check automatically whether the request is a signed request sent from a known mobile device. Furthermore, the reliability of the authentication based on a session created using the mobile device is high and can be considered as reliable as the manual processes discussed above.

In an embodiment, the requests received from a mobile device received by the online system 100 are used to generate a white list of session attributes for the user. The white list of session attributes comprises attributes that can be used to determine whether a session is suspicious or not. For example, a session that includes one or more attributes from the white list is determined to be less suspicious than another session lacking any attribute from the white list. If a request to create a session with the online system is received from a mobile device as indicated by a message encrypted using a mobile key, information identifying the mobile device is added to the white list of the user. If subsequent requests to create a session for the user are received that contain the message encrypted using the mobile key of the same mobile device, session attributes received in these requests are also added to the white list. For example, a geographical location associated with the request received from a known mobile device may be added to the white list. The geographical location may be derived from information received in the request, for example IP addresses or may be provided by a GPS on the device sending the request. Since these attributes are received with requests sent by the user's mobile device, these attributes are considered as safe and therefore added to the white list. Accordingly, subsequent requests received that include these session attributes or are associated with these session attributes are considered not suspicious or less suspicious. Other examples of the session attributes that can be similarly added to the white list include session cookies, values of IP addresses of the device used to send the request, information describing software executing on the device, e.g., version and type of browser or operating system executing on the client device.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving, by an online system, a login request to create a session for a user account of the online system, the login request received from a mobile device having a cryptographic key stored in a permanent storage area of the mobile device at manufacturing of the device and uniquely identifying the mobile device;
   determining that the session is a first login session for the mobile device based on comparing a unique identifier of the mobile device with one or more stored unique identifiers for the user account;
   associating, by the online system, the mobile device with the user account;
   storing, by the online system, a public key in association with the user account, the public key corresponding to the cryptographic key;
   receiving a subsequent request to create a session for the user account from a client device separate from the previously associated mobile device;
   determining whether the subsequent request is suspicious based at least in part on a result of attempting to decrypt an encrypted message received from the client device using the stored public key associated with the user account;
   in response to determining that the subsequent request is suspicious, providing a request to a user associated with the user account requiring the user to send a verifying request to create a session from the previously associated mobile device;
   receiving the verifying request from the previously associated mobile device; and
   verifying an authenticity of the previously associated mobile device by decrypting a message received from the previously associated mobile device.

2. The computer implemented method of claim 1, further comprising:
   responsive to determining that the subsequent request to create a session for the user account is a signed request from the mobile, determining the subsequent request is not suspicious.

3. The computer implemented method of claim 1, wherein verifying that the request is signed by the mobile device comprises:
   decrypting the encrypted message; and
   comparing the message with a predetermined value associated with the mobile device.

4. The computer implemented method of claim 1, wherein the subsequent request is received from a client device, the method further comprising:
   responsive to determining that a distance between a location of the client device and the geographical location of the mobile device exceeds a threshold value, determining the subsequent request to be suspicious.

5. The computer implemented method of claim 4, wherein determining whether the subsequent request is suspicious comprises determining whether the last recorded time for a request comprising the geographical location received from the mobile device is within a threshold of the time of the subsequent request.

6. The computer implemented method of claim 1, further comprising:
   responsive to determining that the subsequent request is suspicious, requiring an enhanced authentication process.

7. The computer implemented method of claim 1, wherein the geographical location associated with the mobile device is obtained from a global positioning system (GPS) of the mobile device.

8. The computer implemented method of claim 1, wherein the contents of the encrypted message are changed based on a predefined schedule.

9. The computer implemented method of claim 1, further comprising:
   receiving a second request from the previously associated mobile device to create a session for a second user account that is connected to the user account originally associated with the previously associated mobile device;
   sending an alert to the user of the user account originally associated with the previously associated mobile device; and
   responsive to receiving a response from the user of the user account originally associated with the previously associated mobile device indicating that the previously associated mobile device has not been lost, adding the second user account to a safe list of user accounts for the previously associated mobile device.

10. The computer implemented method of claim 9, further comprising:
    marking the mobile device as being less reliable for determining whether a login request is suspicious responsive to the safe list of user accounts associated with the mobile device having more than a threshold number of user accounts.

11. The computer implemented method of claim 1, wherein the determining that the session is a first login session further comprises:

transmitting a request to the mobile device to request the unique identifier of the mobile device;

comparing the unique identifier with the one or more stored unique identifiers associated with the user account; and in response to determining that the unique identifier of the mobile device does not match any one of the one or more stored unique identifiers:
storing the unique identifier of the mobile device; and
determining that the session is the first login session for the mobile device.

12. The computer implemented method of claim 11, wherein the unique identifier is a serial number of the mobile device.

13. The computer implemented method of claim 11, further comprising:
transmitting a request to the mobile device to request the public key of the mobile device; and
associating one or more session attributes of the login request with the stored unique identifier of the mobile device.

14. The computer implemented method of claim 13, further comprising:
storing the session attributes in a white list associated with the user account, the white list indicating session attributes of sessions for the user account which have a lower likelihood of being suspicious.

15. The computer implemented method of claim 14, further comprising:
in response to determining that session attributes of the subsequent request are not stored in the white list, determining that the subsequent request is suspicious.

16. The computer implemented method of claim 1, wherein subsequent request is determined to be suspicious when the encrypted message from the client device cannot be decrypted using the stored public key associated with the user account.

17. The computer implemented method of claim 1, wherein the verifying request comprises an email to the user requesting the user to login using the previously associated mobile device.

18. The computer implemented method of claim 1, wherein all login requests are denied until the authenticity of the previously associated mobile device is verified.

19. A non-transitory computer-readable storage medium storing instructions for:
maintaining, by an online system, a user account associated with a cryptographic key of a mobile device, the cryptographic key stored in a permanent storage area of the mobile device at manufacturing of the device and uniquely identifying the mobile device;
associating the mobile device with the user account;
storing a public key in association with the user account, the public key corresponding to the cryptographic key;
receiving a subsequent request from a client device to create a session for the user account from a client device separate from the previously associated mobile device;
determining whether the subsequent request is suspicious based at least in part on a result attempting of decrypt an encrypted message received from the client device using the stored public key corresponding to the cryptographic key;
in response to determining that the subsequent request is suspicious, providing a request to a user associated with the user account requiring the user to send a verifying request to create a session from the previously associated mobile device;
receiving the verifying request from the previously associated mobile device; and
verifying an authenticity of the previously associated mobile device by decrypting a message received from the previously associated mobile device.

20. The non-transitory computer-readable storage medium of claim 19, further storing instructions for:
responsive to determining that the subsequent request to create a session for the user account is a signed request from the mobile, determining that the subsequent request is not suspicious.

21. The non-transitory computer-readable storage medium of claim 19, further storing instructions for:
responsive to determining that the subsequent request is suspicious, requiring an enhanced authentication process.

22. The non-transitory computer-readable storage medium of claim 19, further storing instructions for:
responsive to determining that the subsequent request is suspicious, sending a request to the user to interact with the online system using the mobile device for authentication.

23. The non-transitory computer-readable storage medium of claim 19, further storing instructions for:
decrypting the encrypted message; and
comparing the message with a predetermined value associated with the mobile device.

24. The non-transitory computer-readable storage medium of claim 19, wherein determining whether the subsequent request is suspicious comprises determining whether the last recorded time for a request comprising the geographical location received from the mobile device is within a threshold of the time of the subsequent request.

* * * * *